R. REYES.
APPARATUS FOR THE CHLORINATION OF MINERALS.
APPLICATION FILED AUG. 6, 1915.

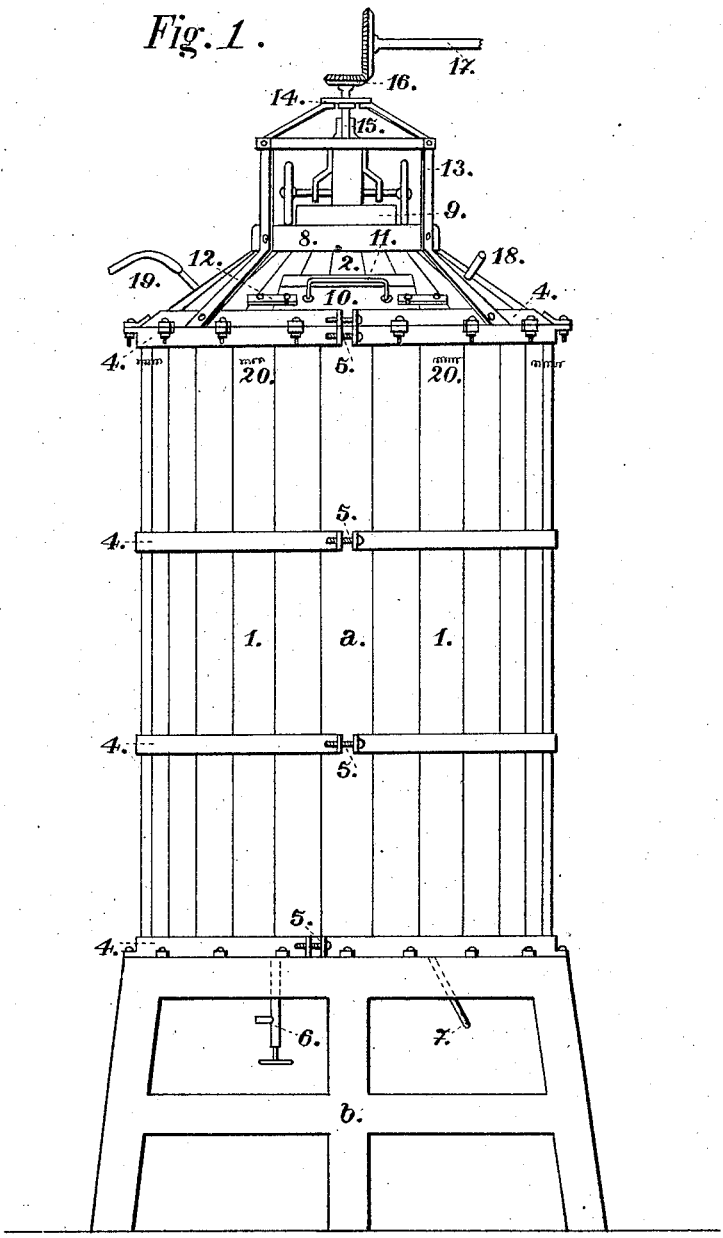

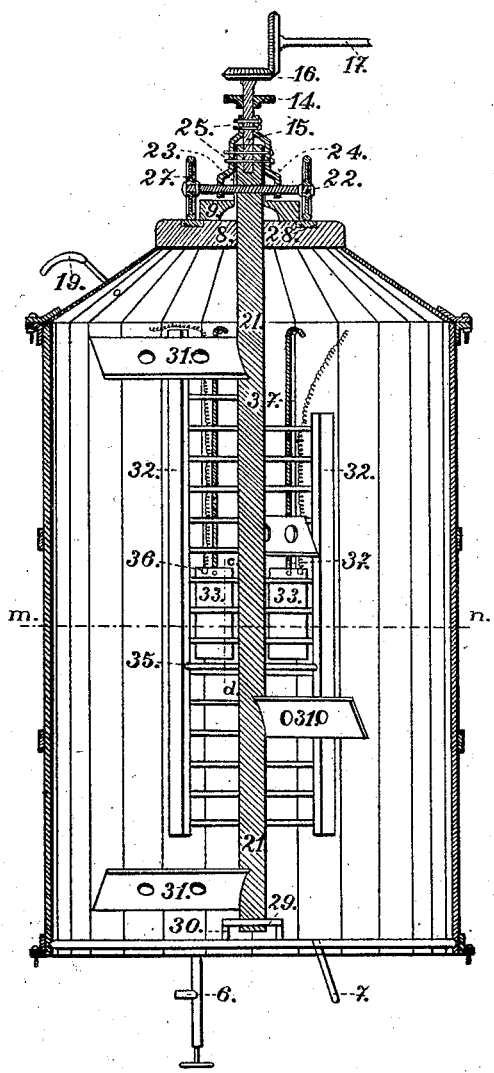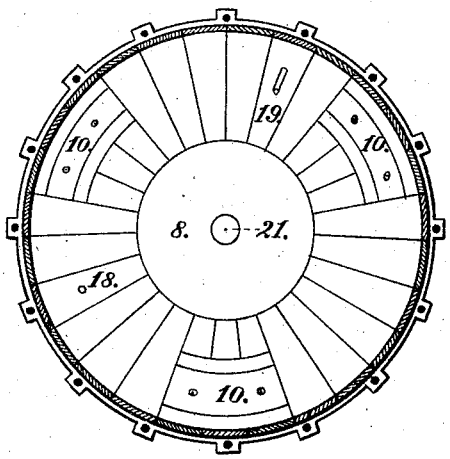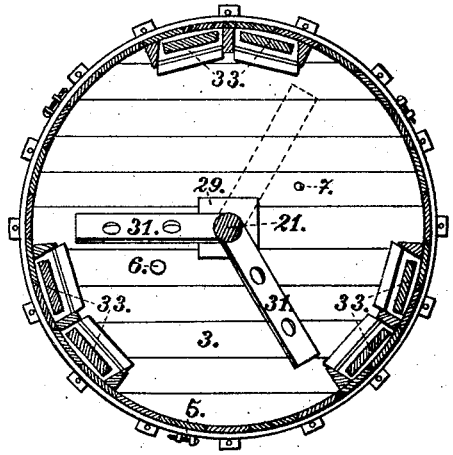

1,243,977.

Patented Oct. 23, 1917.

3 SHEETS—SHEET 3.

Witnesses

Inventor
Ricardo Reyes
his Attorney

UNITED STATES PATENT OFFICE.

RICARDO REYES, OF MEXICO, MEXICO.

APPARATUS FOR THE CHLORINATION OF MINERALS.

1,243,977.   Specification of Letters Patent.   Patented Oct. 23, 1917.

Application filed August 6, 1915. Serial No. 44,115.

*To all whom it may concern:*

Be it known that I, RICARDO REYES, a resident of Mexico city, United States of Mexico, have invented a new and useful Apparatus for the Chlorination of Minerals.

My invention refers to a new and useful apparatus for the chlorination of minerals, in the shape of a tank, whose object is the separation of the gold, silver and other metals from the bodies containing them, through a process of chlorination specially adapted to this apparatus.

Figure 5:
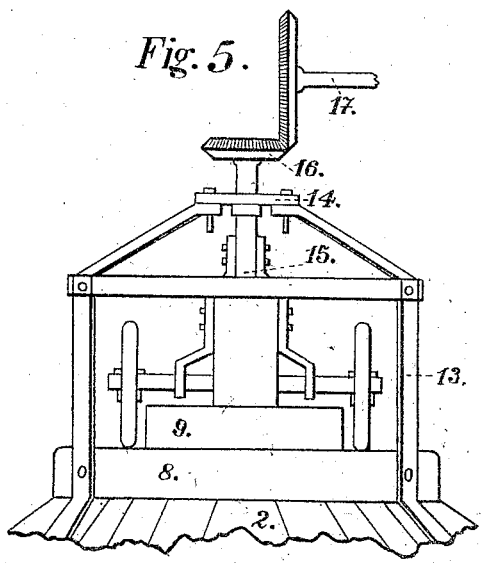
Figure 6:
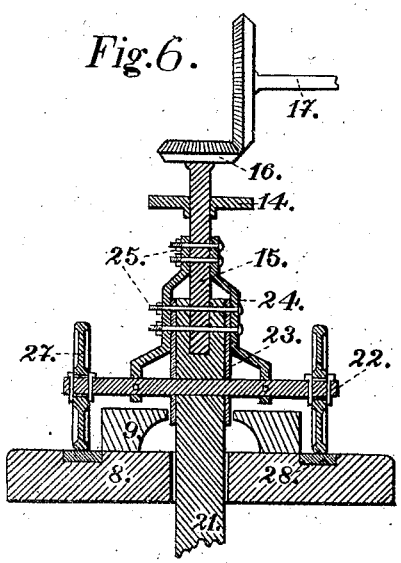
Figure 7:
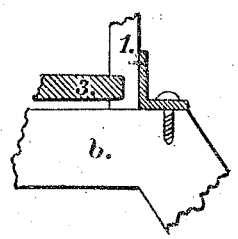
Figure 8:
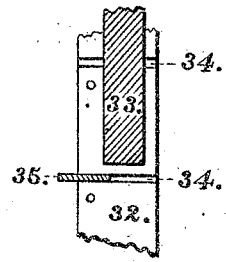
Figure 9:
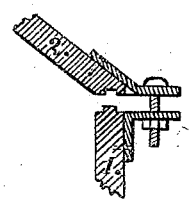
Figure 12:
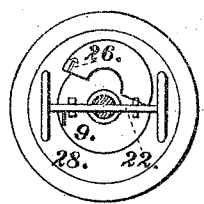
Figure 11:
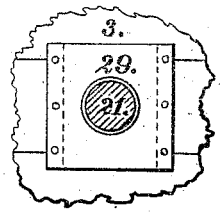
Figure 10:
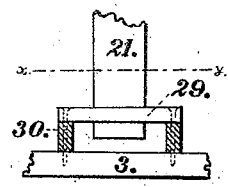

Figure 1 represents a front elevation of the complete apparatus. Fig. 2 is a vertical section thereof. Fig. 3 is a horizontal section along line *m—n* of Fig. 2. Fig. 4 is a bottom view of the cover. Fig. 5 is an elevation of the upper part of Fig. 1 on a larger scale. Fig. 6 represents the top of Fig. 2 on a larger scale. Figs. 7 and 9 are details showing the union of the body of the vessel with the bottom or base, and with the cover respectively. Fig. 8 is a side view of the carbons and the ladders with the rungs. Figs. 10 and 11 are respectively an elevation and a plan view of the bench or bearing for the lower end of the vertical shaft 21. Fig. 12 is a detail view showing the means for tightening the packing of the cover.

The tank is composed of a vessel formed of three parts; a cylindrical one that forms the main body of the vessel; a conical one that serves as cover, and finally the bottom that can be a flat surface or a conical or spherical. Those parts are built of wood staves fastened together with external iron bands (4) having lugs with fastening screws (5) so as to tighten them when necessary. The whole vessel is placed on a foundation (*b*). The piston cock (6) which serves for emptying the vessel is placed at the bottom of same.

The pipe (7) at the bottom of the tank serves to introduce the chlorin gas used in the process. The cover terminates its upper part in a flat top on which is placed the packing or stuffing box (9). On the same cover as seen in Fig. 4 there are three openings (10). Each opening is provided with a lid having a handle (11) and a yoke (12), as seen in Fig. 1. When these lids for the openings 10 are turned to one side, access can thus be secured to the interior of the tank. The metallic skeleton (13) shown in Fig. 5 sustains the metallic bearing (14) of the shaft (15) which is also made of metal and which ends in a bevel gear (16) which is driven by the main shaft (17). The opening (18) shown in Fig. 4 serves for the introduction of the mineral to be acted upon in suitable form, and the outlet tube (19) allows the chlorin employed in the proceeding to escape. The chlorin thus enters at the bottom of the tank through inlet 7, and emerges from the top of the tank to outlet 19, so that the liquid content of the tank is agitated.

The wires for carrying the electric current pass in through contacts 20, as seen in Fig. 1. The metallic shaft (15) is connected with the wooden shaft (21) which is crossed by the metal shaft (22) and strengthened at its upper part by the metallic ring (23). The shaft (22) and shafts (21) and (15) are united by the iron bars (24) which are fixed by means of screws (25). The packing or stuffing box (9) which can be seen in detail in Fig. 12, opens to receive the packing which is tightened by means of screw (26).

Shaft (22) is sustained by the wheels (27) and turns on the circular track (28) as seen in Fig. 2, so that the shaft does not rest on its lower end, but is supported on this track 28. This shaft has four wings or stirrers (31) having holes, which serve to agitate the solution. Two of the stirrers are inclined in one direction and the other two in the opposite one, in order to agitate the solution more thoroughly. As shown in Figs. 10 and 11, the lower end of the shaft (21) turns in guide (29) which is of wood and is borne by the little pillars (30). The solution which is being agitated can pass freely under this guide.

In the Fig. 2 two ladders can be seen, formed by the vertical strips (32) and the horizontal wooden bars 35 that form the rungs, as shown in Fig. 8. The vertical strips (32) serve as guides for two carbons (33). Over each rung a guide (34) is fixed on the vertical strips 32, on which and at the desired height a board (35) for sustaining the carbons 33, is placed. Electric contacts (36) and the conducting cables (37) for sustaining and moving the carbons.

As shown in Fig. 3, there are three pairs of carbons (33) exactly alike to those described. The ladders have the same height as the smaller shown in Fig. 2 or the one at the right side. The ladder on the left side is higher in order to offer easy access to the workingmen into the inside of the vessel.

Corresponding to every pair of carbons, there is a window or opening 10 in the cover as shown in Fig. 4. The widest and largest opening corresponds to the pair of carbons shown on Fig. 2, i. e., where the ladder for the workingmen is found. The others only serve to place the carbons and to take them out by means of the cable (37).

The operation of my apparatus is as follows:

By manipulating the handles 11, the lids of the openings 10 can be moved to one side so as to leave these openings free. Then the workmen can descend into the tank by means of the ladder on the left-hand side, and fix the carbons 33 upon the three ladders. By means of these ladders it is possible to fix the carbons at any desired height, where they are held by the supporting cables 37. The tank is now filled with solution through the opening 18, and also with the mineral to be chlorinated. This mineral may be in any desired form which is suitable for chemical treatment, the powder form being customary. The form of the mineral, however, in itself is no part of my invention. The chlorin is now admitted through the inlet 7 and allowed to escape through the outlet 19, the top of the vessel being tightly closed by means of the packing or stuffing box 8. At the same time current is passed through the carbons so that electrolysis is performed in the usual manner. This tank can be used therefore for practising the process set forth in my copending application Serial No. 871,186, the carbons being directly immersed in the solution to be electrolyzed, and containing the mineral to be treated. In this process the ores to be decomposed are immersed in powdered form in a solution of chlorin salt, such as ordinary sodium chlorid, and the electrodes are directly immersed in the solution of the said chlorin salt.

By means of the peculiar arrangement of the bearings of the vertical shaft, and the construction of the tank, although the entire structure is strong and stable, the chlorin only comes into contact with wood or other material which is unaffected thereby.

I have described one embodiment of my invention, but it is clear that changes might be made in the details thereof without departing from the spirit thereof, as set forth in the appended claim.

Claim:

In a chlorination tank, a receptacle for containing a solution to be electrolyzed, a top for said tank, openings in said top, ladders leading from said openings, one of said openings being so wide and the ladder being so large as to permit the entrance of a workman into said tank, said ladders being adapted to support electrodes in said receptacle at any desired height, and means for connecting said electrodes to a source of electric power.

In testimony whereof, I affix my signature in presence of two witnesses:

RICARDO REYES ELIZONDO.

Witnesses:
 ALFRED GAMARD,
 P. IBARROLA.